United States Patent
Maskell et al.

(10) Patent No.: US 11,390,448 B2
(45) Date of Patent: Jul. 19, 2022

(54) SELF-HEATING FOOD POUCH WITH DISTRIBUTED REACTANTS

(71) Applicant: Tempra Technology, Inc., Bradenton, FL (US)

(72) Inventors: Alan J. Maskell, Grittleton (GB); Cullen M. Sabin, Bradenton, FL (US)

(73) Assignee: Tempra Technology, Inc., Bradenton, FL (US)

( * ) Notice: Subject to any disclaimer, the term of this patent is extended or adjusted under 35 U.S.C. 154(b) by 83 days.

(21) Appl. No.: 16/631,960

(22) PCT Filed: Jul. 19, 2018

(86) PCT No.: PCT/US2018/042867
§ 371 (c)(1),
(2) Date: Jan. 17, 2020

(87) PCT Pub. No.: WO2019/018626
PCT Pub. Date: Jan. 24, 2019

(65) Prior Publication Data
US 2020/0165053 A1    May 28, 2020

Related U.S. Application Data

(60) Provisional application No. 62/534,915, filed on Jul. 20, 2017.

(51) Int. Cl.
*B65D 81/34* (2006.01)
*F24V 30/00* (2018.01)
*B65D 75/54* (2006.01)

(52) U.S. Cl.
CPC ....... *B65D 81/3484* (2013.01); *B65D 75/545* (2013.01); *F24V 30/00* (2018.05)

(58) Field of Classification Search
CPC . F24J 1/00; A24J 36/28; A24J 36/2411; A24J 36/2444; B65D 81/3484
(Continued)

(56) References Cited

U.S. PATENT DOCUMENTS

| 4,265,216 A | 5/1981 | Marshall et al. |
| 4,522,190 A | 6/1985 | Kuhn |

(Continued)

FOREIGN PATENT DOCUMENTS

| JP | 2017-508680 | 3/2017 |
| WO | 200230251 | 4/2002 |
| WO | 2016160408 | 10/2016 |

OTHER PUBLICATIONS

International Search Report and Written Opinion for PCT/US18/42867 dated Oct. 15, 2018.
(Continued)

*Primary Examiner* — Vivek K Shirsat
(74) *Attorney, Agent, or Firm* — Sheehan Phinney Bass & Green PA

(57) ABSTRACT

A self-heating product pouch has a first thin flexible material that surrounds and defines a product compartment. A second thin flexible material is coupled to an outwardly-facing surface of the first thin flexible material to define a first heater compartment that is outside, but thermally coupled to, the product compartment. A first thin porous substrate inside the first heater compartment. A granular reactant is distributed throughout the first thin porous substrate. A frangible container is inside the first heater compartment. A liquid reactant is inside the frangible container. The granular reactant and the liquid reactant are adapted to react exothermically upon contact with one another.

39 Claims, 6 Drawing Sheets

(58) Field of Classification Search
USPC .... 126/263.02, 263.03, 269, 263.01, 263.04, 126/263.05, 263.07, 263.08
See application file for complete search history.

(56) References Cited

U.S. PATENT DOCUMENTS

| | | | |
|---|---|---|---|
| 5,425,975 A * | 6/1995 | Koiso | C09K 5/16 428/137 |
| 6,036,004 A | 3/2000 | Bowen | |
| 6,341,602 B1 | 1/2002 | Fulcher | |
| 8,635,998 B2 | 1/2014 | Madan et al. | |
| 9,278,796 B2 | 3/2016 | Huffer et al. | |
| 2002/0119220 A1 | 8/2002 | Costello | |
| 2008/0097356 A1* | 4/2008 | Donovan | A61Q 19/10 604/291 |
| 2009/0025706 A1* | 1/2009 | Cho | A47J 36/28 126/263.07 |
| 2009/0148570 A1* | 6/2009 | Bommaraju | C01G 55/00 426/109 |

OTHER PUBLICATIONS

European Search Report and Written Opinion for EP18835461 dated Feb. 9, 2021.
Office Action for JP2020-502355, dated Apr. 18, 2022.

* cited by examiner

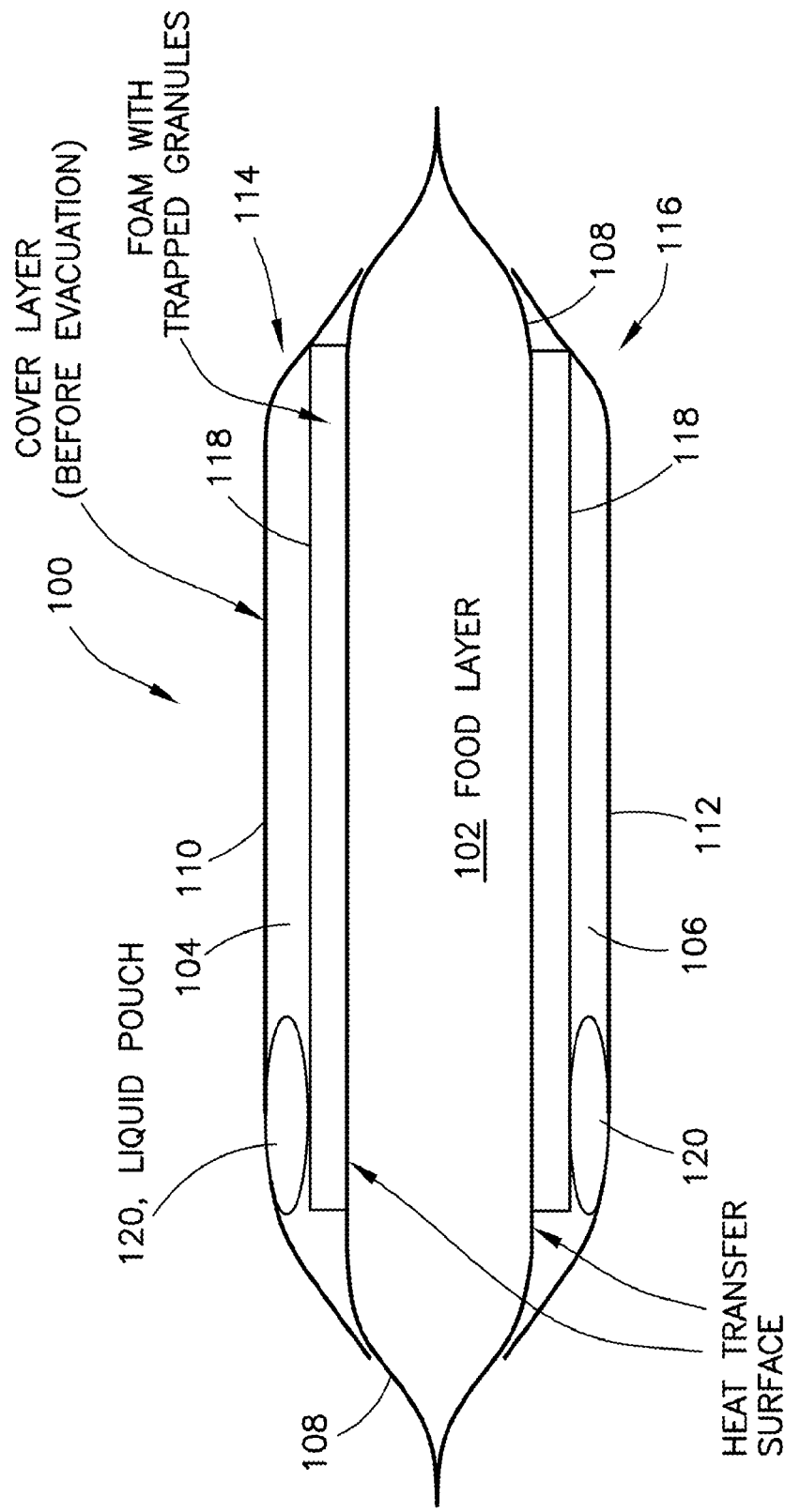

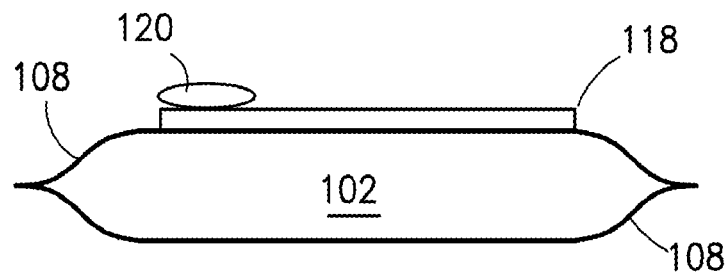
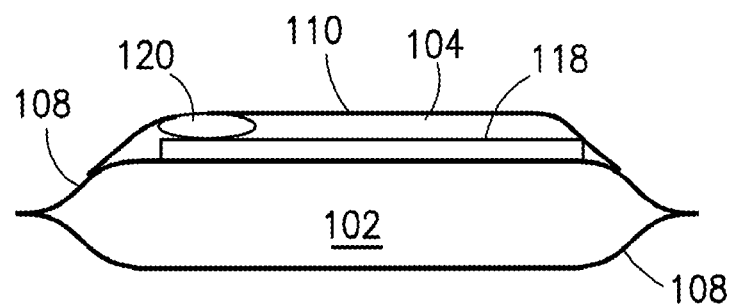
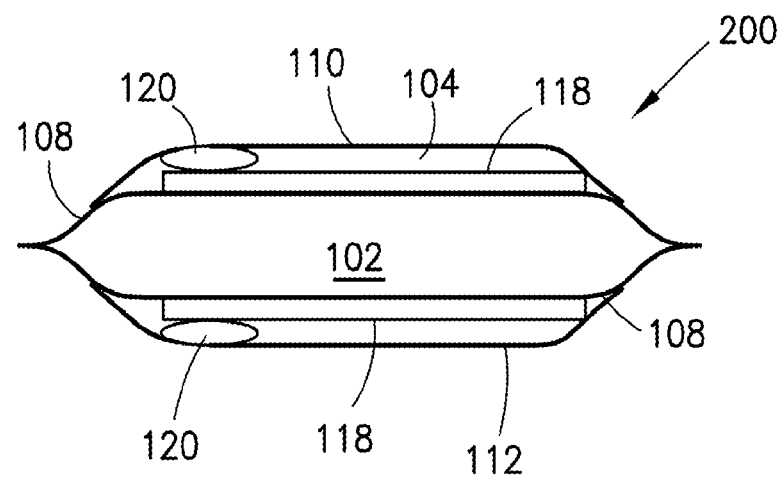

SELF-HEATING FOOD POUCH WITH DISTRIBUTED REACTANTS

CROSS-REFERENCE TO RELATED APPLICATION(S)

This application is a national stage application, filed under 35 U.S.C. § 371, of International Application No. PCT/US18/42867, filed Jul. 19, 2018, which claimed the benefit of U.S. Provisional Patent Application No. 62/534,915, filed Jul. 20, 2017, The contents of the prior applications are incorporated by reference herein in their entireties.

FIELD OF THE INVENTION

This disclosure relates to a self-heating food pouch and, more particularly, relates to a self-heating food pouch with distributed reactants therein.

BACKGROUND

Many foods are packaged in shelf-stable pouches, and are by various means heated in the sealed pouch immediately before serving. Some of these pouches may be submerged in boiling water or heated in a microwave. Other heating techniques may be available as well.

SUMMARY OF THE INVENTION

In one aspect, a self-heating product pouch has a first thin flexible material that surrounds and defines a product compartment. A second thin flexible material is coupled to an outwardly-facing surface of the first thin flexible material to define a first heater compartment that is outside, but thermally coupled to, the product compartment. A first thin porous substrate is placed inside the first heater compartment. A granular reactant is distributed (e.g., with substantial uniformity) throughout the first thin porous substrate. A frangible container is inside the first heater compartment. A liquid reactant is inside the frangible container. The granular reactant and the liquid reactant are adapted to react exothermically upon contact with one another.

In a typical implementation, the granular reactant is distributed in the thin porous substrate with a sufficient degree of uniformity such that any resulting exothermic reaction between the granular reactant and the liquid reactant will produce a substantially uniform amount of heat across an entirety of the thin porous substrate. In some implementations, this means that, in any two different, equal volumes (i.e., cubic centimeters or larger) of the thin porous substrate, the density of grains in those volumes does not vary more than 15% or 20%.

In yet another aspect, a method is disclosed for producing a self-heating product pouch. The method includes distributing a granular reactant throughout a thin porous substrate (e.g., with substantial uniformity), placing the thin porous substrate in physical contact with a surface of a first thin flexible material, providing a frangible container that contains a liquid reactant, positioning the frangible container near or in contact with the thin porous substrate, and coupling a second thin flexible material to the surface of the first thin flexible material to define a first heater compartment that contains the thin porous substrate with the distributed granular reactant, and the frangible container. The granular reactant and the liquid reactant are adapted to exothermically react upon contact with one another. In some implementations of the invention(s) disclosed herein, one or more of the following advantages may be present.

For example, in some implementations, an easy, convenient, effective, and safe heater is provided to heat a product (e.g., food) without utilizing an external heating source (e.g., fire, oven, microwave, etc.). Moreover, the heating effect produced tends to be highly uniform throughout the product compartment. This is due to the fact that, in some implementations at least, heating is performed from both sides of the product compartment. Moreover, in a typical implementation, in each heater, the heat produced (and delivered into the product compartment) is substantially uniform across the entire width and length of the heater.

Other features and advantages will be apparent from the description and drawings, and from the claims.

BRIEF DESCRIPTION OF THE DRAWINGS

FIG. 1 is a cross section of an exemplary implementation of a self-heating pouch for heating a product (e.g., food) contained therein.

FIGS. 2A-2G show an exemplary self-heating food pouch at various stages of production according to one exemplary technique.

DETAILED DESCRIPTION

Figure 2A:
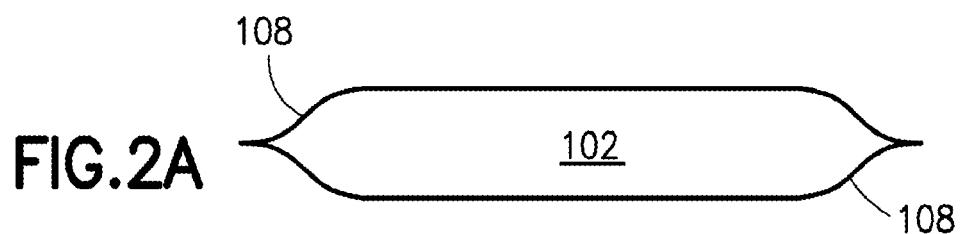
Figure 2B:
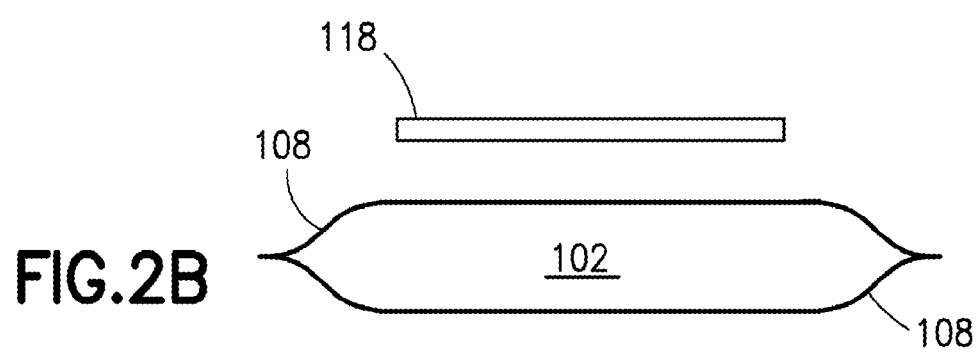
Figure 2C:
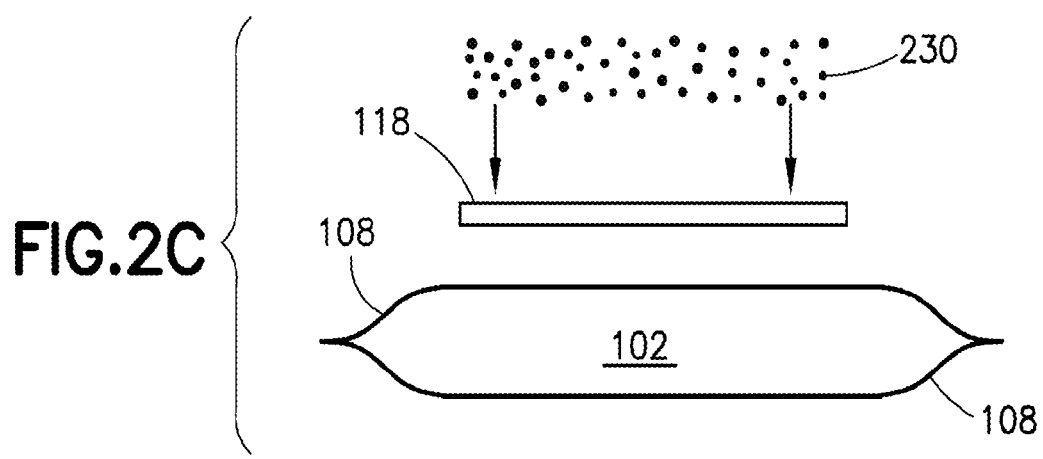
Figure 2D:
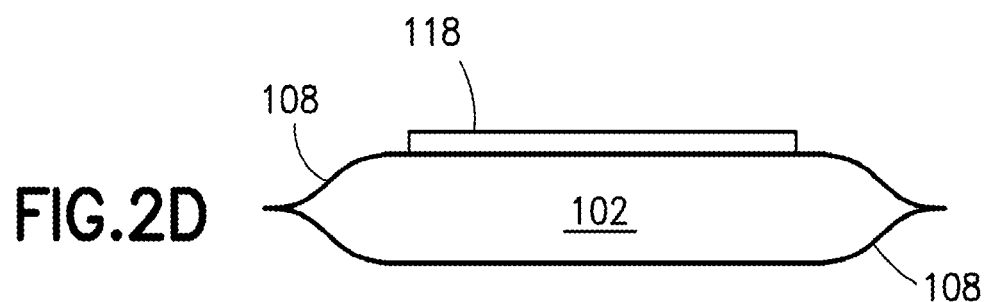

FIG. 1 is a cross section of an exemplary implementation of a self-heating pouch 100 for heating a product (e.g., food) contained therein.

The illustrated self-heating food pouch 100 has a product compartment 102 and a pair of heater compartments 104, 106 outside, adjacent to, and in thermal contact with the product compartment 102. In the illustrated implementation, each heater compartment 104, 106 is in thermal contact with the product compartment 102 by virtue of the fact that it is physically adjacent to and separated from the product compartment 102 by only a single piece of thin flexible material.

According to the illustrated implementation, a first thin flexible material 108 surrounds and defines the product compartment 102. More particularly, in the illustrated implementation, there are two pieces of the first thin flexible material 108. The two pieces of the first thin flexible material are similarly sized and sealed together at their edges (i.e., about an enter periphery of each to form a completely enclosed, and sealed product compartment 102). The product compartment 102 is between the two pieces of the first thin flexible material 108 and within the sealed perimeter.

The first thin flexible material can be any one of a variety of different materials. In general, the first thin flexible material can be any kind of material that is thin, flexible, able to withstand exposure to liquid and heat, able to facilitate heat transfer into the product compartment, and compatible with whatever product (e.g., food, etc.) that is provided in the product container. The flexible material may be a clear or opaque. Moreover, in a typical implementation, the thin, flexible material has a thickness between about 0.002 inches and 0.010 inches.

There are a variety of techniques that can be used to seal the two pieces of first thin flexible material together at their edges. Some of these techniques include heat sealing and selectively applying an adhesive between the two pieces of first thin flexible material. There are a variety of adhesives that can be utilized in this regard. Typically, the adhesive should be one that can withstand exposure to liquid, some pressure, and whatever amount of heat the adhesive is expected to experience during the food pouch's life cycle (e.g., while the product is being heated). The seal typically extends around an entire periphery of the two pieces of the first thin flexible material, leaving a central portion of each piece of first thin flexible material (within the sealed periphery) unsealed. In this manner, the two pieces of material, when sealed together, form a pocket that contains the product to be heated. After heating, when the product is ready to be consumed, the pocket is configured such that it can be opened to provide user access to the heated product therein.

A second thin flexible material 110 is coupled to a first outwardly-facing surface of the product compartment 102 to define a first heater compartment 114 that is outside, but thermally coupled to, the product compartment 102.

The second thin flexible material 110 can be any one of a variety of different materials. In general, the second thin flexible material is thin, flexible, and able to withstand exposure to liquid and the heat that is produced inside the first heater compartment. This flexible material may be a clear or opaque. Moreover, the thickness of the second thin flexible material 110 can be anywhere within the range of possible thicknesses specified above, with respect to the first thin flexible material. In some implementations, the second thin flexible material is the same type of material as the first thin flexible material.

The second thin flexible material 110 in the illustrated implementation is a single piece of material that is sealed, around its edges, to the outwardly-facing surface of the product compartment 102. The seal, in the illustrated implementation, extends around an entire periphery of the second thin flexible material 110, leaving a central portion of the second thin flexible material 110 (within the sealed periphery) not sealed against the outwardly-facing surface of the product compartment. In this manner, the second thin flexible material 110 and a portion of the outwardly-facing surface of the product compartment, when sealed together, form the first heater compartment 114.

A third thin flexible material 112 is coupled to a second outwardly-facing surface of the product compartment 102 to define a second heater compartment 116 that is also outside, but thermally coupled to, the product compartment 102. The second heater compartment 116, in the illustrated implementation, is at a side of the self-heating pouch 100 opposite the first heater compartment 114.

Like the first and second thin flexible materials, the third thin flexible material 112 can be any one of a variety of different materials. In general, the third thin flexible material is thin, flexible, and able to withstand exposure to liquid and the heat that is produced inside the second heater compartment. This flexible material may be a clear or opaque. Moreover, the thickness of the third thin flexible material 112 can be anywhere within the range of possible thicknesses specified above, with respect to the first thin flexible material. In some implementations, the third thin flexible material is the same type of material as the first thin flexible material, the second thin flexible material, or both.

The third thin flexible material 110 in the illustrated implementation is a single piece of material that is sealed, around its edges, to the second outwardly-facing surface of the product compartment 102. The seal, in the illustrated implementation, extends around an entire periphery of the third thin flexible material 110, leaving a central portion of the third thin flexible material 110 (within the sealed periphery) not sealed against the outwardly-facing surface of the product compartment. In this manner, the third thin flexible material 110 and a portion of the outwardly-facing surface of the product compartment, when sealed together, form the second heater compartment 114.

Each heater compartment 114, 116 contains a thin porous substrate 118 (e.g., an open cell foam material) that is in physical contact with, and preferably adhered to, a corresponding one of the outwardly-facing surfaces of the product compartment 102. Each thin porous substrate 118 typically has a thickness between about 0.0625 inches and 0.250 inches. In a typical implementation, the length and the width of each porous substrate is such that each porous substrate extends, substantially entirely, across an entirety of the portion of the outwardly-facing surface of the first thin material that forms part of the corresponding heater compartment.

In some implementations, each thin porous substrate is adhered to a corresponding one of the outwardly-facing surfaces of first thin material 108. In some implementations, the heater compartments 104, 106 are sized such that each thin porous substrate 118 is held in place, pressed against the corresponding outwardly-facing surface of first thin material 108 by the second or third piece of material 110, 112.

A granular reactant (not shown in FIG. 1) is distributed, with substantial uniformity, through each of the thin porous substrates 118. The granular reactant is generally distributed in each thin porous substrate 118 with a sufficient degree of uniformity such that any resulting exothermic reaction between the granular reactant and the liquid reactant will produce a substantially uniform amount of heat across an entirety of the thin porous substrate 118. In some implementations, this means that, in any two different, equal volumes (i.e., cubic centimeters or larger) of the thin porous substrate, the density of grains in those volumes does not vary more than 15% or 20%.

Each thin porous substrate 118 is permeable to the liquid reactant. Moreover, in some implementations, each thin porous substrate 118 is configured to wick the liquid reactant throughout. This permeability and/or wicking ability helps facilitate the quick exposure of the entire thin porous substrate, and all of the granular reactant therein, to the liquid reactant, once the liquid reactant is permitted to access the thin porous substrate 118.

Each thin porous substrate 118 is further configured to support and substantially maintain the substantially uniform distribution of granular reactant throughout the thin porous substrate 118 during ordinary shipping and handling of the self-heating pouch. Moreover, each thin porous substrate 118 is configured to prevent substantial movement of the granular reactant contained therein even when the liquid reactant contacts the granular reactant and while the resulting exothermic chemical reaction is taking place to heat the product contained in the self-heating pouch. This helps ensure reliable, even heating of the product contained in the product compartment throughout the heating process.

Each heater compartment 114, 116 contains a frangible container 120 (e.g., a liquid-filled pouch). In a typical implementation, each frangible container 120 is formed from a thin flexible material. In general, this thin flexible material is thin, flexible, and able to withstand exposure to liquid (e.g., the liquid reactant it contains) and the heat that is occurs inside the each heater compartment. This flexible material may be a clear or opaque. Moreover, the thickness of this thin flexible material can be anywhere within the range of possible thicknesses specified above, with respect to the first thin flexible material.

In some implementations, each frangible container 120 is formed from two pieces of the thin flexible material, similarly sized and sealed together at their edges (i.e., about an enter periphery of each to form a completely enclosed, and sealed compartment to contain the liquid reactant prior to heater activation). In some implementations, each frangible container 120 is formed from one piece of material that is sealed onto itself to create the completely enclosed and sealed compartment to contain the liquid reactant prior to heater activation.

The frangible membranes 120, in the illustrated implementation, are at the same relative position inside their respective heater compartments 114, 116. More particularly, in the illustrated implementation, each frangible membrane 120 is near a first end of its heater compartment 114, 116 and in physical contact with the thin porous substrate 118 inside its heater compartment 114, 116. This arrangement of frangible membranes—with both at the same (or substantially similar) positions inside their respective heater compartments 114, 116—makes it very convenient for a user to initiate a heating event in both heater compartments with one move—by simply squeezing the outside of the self-heating pouch 100 from opposite sides of the pouch (e.g., with two fingers) to rupture both frangible membranes 120.

Thus, it is desirable, in some implementations, for the frangible membranes 120 to be located at the same relative position inside their respective heater compartments 114, 116. Of course, that does not require the frangible membranes to be located where they are shown in FIG. 1. Instead, each respective frangible membrane 120 can be located at a more central location within its corresponding heater compartment 120. As long as both are at the same, or substantially the same, relative position as the other, the heater should be relatively easy to activate with a simple squeeze.

In a typical implementation, the frangible membranes 120 are held in place within their respective heater compartments. This can be done in a number of possible ways. In some implementations, each frangible membrane 120 is adhered to a nearby surface (e.g., a surface of the corresponding thin porous substrate 118 or an inner surface of the thin flexible material that forms the outer cover of the associated heater compartment. In some implementations, each frangible membrane is held in place without an adhesive, by virtue of the outer cover of the associated heater compartment pressing the frangible membrane, lightly, but securely, against the thin porous substrate 118 in that heater compartment.

The frangible membranes 120 are generally configured to maintain their structural integrity (and not rupture) during normal shipping and handling, but to rupture with the deliberate application of a small force (e.g., from a user's hand(s) or fingers) to an outside of the self-heating pouch. Moreover, in a typical implementation, the frangible membranes 120 are configured to rupture upon the application of a force that is not strong enough to rupture the product compartment or any of the heater compartments.

There are a variety of ways to ensure that this result (i.e., that the frangible material can be ruptured without rupturing the product compartment and heater compartments) is achieved. For example, in some implementations, the frangible membranes are made from a thinner material than the product compartment or any of the heater compartments. Generally speaking, a thinner piece of material will rupture with a lower amount of applied force than a thicker piece of the same type of material. In some implementations, the structural integrity of the frangible membrane 120 may be otherwise compromised (e.g., by the use of a weaker or less adhesive or weak points in the adhesive, etc.) to ensure that the frangible membrane ruptures upon the application of a force that is lower than would be required to rupture the product compartment or any of the heater compartments.

A liquid reactant is inside the frangible container 120. The liquid reactant can be any one of a variety of different liquid reactants that is able to react in an exothermic manner upon contact with the granular reactant in the thin porous membrane 118. In one exemplary implementation, the liquid reactant is a polyol in water solution and the granular reactant includes potassium permanganate. In general, the granular reactant and the liquid reactant react exothermically with each other upon contact (e.g., when the frangible container 120 is ruptured and the thin porous substrate 118 wicks the liquid reactant into it to facilitate contact with the granular reactant distributed throughout the thin porous substrate 118).

Food (or another product to be heated 102) is within the product compartment 104. The food is heated by the exothermic reaction that occurs between the granular reactant and the liquid reactant.

The illustrated self-heating pouch 100 is configured such that heat from the exothermic reaction—in the first heater compartment and/or the second heater compartment—can pass through heat transfer surfaces—defined by a portion of the first thin flexible material 108—into the product (e.g., food) in the product compartment 102.

In some implementations, the self-heating pouch 100 has an adhesive that secures the thin porous substrates 118 to the outwardly-facing surfaces of the product compartment 102 (e.g., first thin flexible material 108).

The heater compartments 104, 106 can be vacuum packed, as can other portions of the self-heating food pouch 100 (e.g., the product compartment 102). When the heater compartments 104, 106 are vacuum packed, the thin flexible materials 110, 112 press the thin porous substrate 118 against the outwardly-facing surface of the product compartment 102 (i.e., the first thin flexible material 108) thereby holding the thin porous substrate 118 in place. Moreover, the pressing of the thin porous substrates 118 against the outwardly-facing surface of the product container 102 by the thin flexible materials 110, 112 discourages movement of distributed granular reactant relative to the thin porous substrates 118 as the pouch is handled and/or as heating occurs. This pressing also may press the frangible containers 120 against the outwardly-facing surfaces of the product container 102 thereby holding the frangible containers 120 in place.

In a typical implementation, the frangible containers 120 (and the food pouch overall) is configured such that, a person squeezing an external surface of the self-heating food pouch 100 can rupture one (or both) of the frangible containers 120.

The thin porous substrates 118 are generally configured to wick the liquid reactant and thereby facilitate contact with the granular reactant distributed throughout the thin porous substrates 118 after the frangible containers 120 have been ruptured.

The heater compartments 104, 106 are configured to remain sealed during the exothermic reaction and throughout the life of the self-heating food pouch 100. The product compartment 102 is configured to remain sealed substantially throughout the heating process and to be opened to allow consumption or use of the food or product contained therein after heating.

Typically, the granular reactant is distributed throughout the thin porous substrates 120 with substantial consistency across the entireties of the thin porous substrates 120. The thin porous substrate typically is thin—e.g., it may have a thickness no greater than ¼ inch or ⅛ inch.

The distance across the product compartment 102 (from heater to heater) typically is much shorter than other dimensions (e.g., height or width) of the product compartment. This facilitates quick and even heating of the product. Typically, the distance across the product compartment (from heater-to-heater) is no more than three inches, more preferably no more than two inches, and even more preferably no more than one inch. Typically, the height and width of the product compartment 102 are more than three inches.

FIGS. 2A-2G show an exemplary self-heating food pouch 200 at various stages of production according to one exemplary technique.

According to the illustrated implementation, producing the self-heating food pouch 200 includes providing a product compartment 102 formed from two pieces of a first thin flexible material 118 (FIG. 2A) sealed together at their edges, providing a thin porous substrate 118 (FIG. 2B), distributing a granular reactant 230 throughout the thin porous substrate 118 (FIG. 2C), placing the thin porous substrate 118 (containing the granular reactant, in physical contact with (and, optionally, adhering it to) one outer surface of the first thin flexible material 108 (FIG. 2D), providing a frangible container 120 that contains a liquid reactant and positioning the frangible container 120 near or in contact with the thin porous substrate 118 (FIG. 2E), and coupling a second thin flexible material 110 to the surface of the first thin flexible material 108 to define a first heater compartment 104 that contains the thin porous substrate 118 with the distributed granular reactant, and the frangible container 120 with the liquid reactant (FIG. 2F). The granular reactant and the liquid reactant, of course, are able to react exothermically with each other upon contact.

The method may further include forming a second heater compartment 106 (FIG. 2G) at a second side of the product compartment 102, opposite the first heater compartment 104. This may be achieved by following steps similar to those outlined above for forming the first heater compartment 104. This results in a third thin flexible material 112 coupled to a surface of the thin flexible material 108 (opposite the first heater compartment 104) to define the second heater compartment 106 that contains another thin porous substrate 118 (with more of the granular reactant) and another frangible container (with more of the liquid reactant). The product compartment 102, in the illustrated heater pouch 200 is, as typical, disposed between the first heater compartment 104 and the second heater compartment 106. The order of steps in manufacturing a particular self-heating pouch (e.g., 100 or 200) can vary considerably.

The heater compartment(s) may be vacuum packed so that the second and third thin flexible materials 110, 112 that respectively covers the first and second heater compartments 104, 106 press the thin porous substrates 118 against the heat transfer surface of the product compartment 102 thereby holding the thin porous substrates 118 in place, and helping to hold the distributed granular reactant in place as well.

In some implementations, the heat pouch and techniques disclosed herein make it convenient to heat a product in a pouch for consumption of the contents under circumstances in which no conventional source of heat is available. This may be accomplished by attaching one or more chemical heaters to the pouch. Existing devices for heating product suffer from a variety of problems. Some vent large amounts of hydrogen, and provide a serious fire and explosion hazard. In others, both food and heater materials sag to the bottom of the flexible bag so that the heat transfer area between the two is limited, or must depend on heat transfer by steam. Most are bulky and clumsy to use. The system described here is compact, provides a distributed source of energy so that it can heat a large surface area of a thin layer of viscous foodstuffs within a time period interesting to a normal consumer.

In some instances, it is desirable that the food layer in contact with the heater be as thin as possible, since in the absence of stirring, heat transfer in the food is by conduction alone. Moreover, in some instances, it is desirable that as much of the food surface as possible is contacted by the heater, so that the temperature of the food is uniform, without hot and cold spots.

At the end of the heating process it may be the case that viscous or lumpy foods (such as beans in sauce), will be nearly as hot as the heater contents at the heated surface, and taper off the farther the distance from the surface. This effect can be ameliorated by making the layer of food as thin as practical, and by heating from both sides.

For very fast, uniform heating without stirring, the contents of the heater should remain distributed evenly over the surface of the food during the heating process. In some heaters containing liquid components or dry components wetted by a liquid to accomplish the heating, the heating materials may slide to the bottom of the pouch and the heat transfer area is small. In some implementations, the systems and techniques described here provide a heater in which the heat-evolving reaction remains evenly distributed over the surface of the pouch during the entire heating process.

The chemical heating reactions of most interest in this disclosure produce heat by either one of at least two reactions. One is by the oxidation reaction of a polyol in water solution and a solid containing potassium permanganate and, optionally, other ingredients; or by the slaking of quicklime by addition of water. In both cases one of the components is a solid which can consist of small granules, while the other component is a liquid.

One notable aspect of the distributed heater described here is the introduction of a thin porous substrate, such as an open-celled foam, which may be bonded to the surface adjacent to the product to be heated. The granular solid is distributed throughout the substrate and the assembly is provided with a frangible pouch containing the liquid. The pouch may be a separate package within the heater or may be formed with and attached to an edge. The heater is then evacuated and sealed so that external pressure on the outside clamps the granular solid in place in the foam. The granules cannot, in those instances, escape from the substrate during handling. Two of these heaters may be sealed back to back to form a pouch, which holds the food. When the pouch is completed, the heaters are on the outside, and are covered with insulation so that the assembly may be handled during the heating process.

When heating is desired, the fuel pouch is ruptured, allowing the liquid to wick throughout the foam. The pack relaxes from its evacuated form but the foam stays in place, as do the granules and the liquid, since they are trapped in the foam. Because the foam is bonded to the heat transfer surface and the chemical reactants are trapped in the foam the heat generation remains distributed over the surface of the food pouch.

Figure 3:
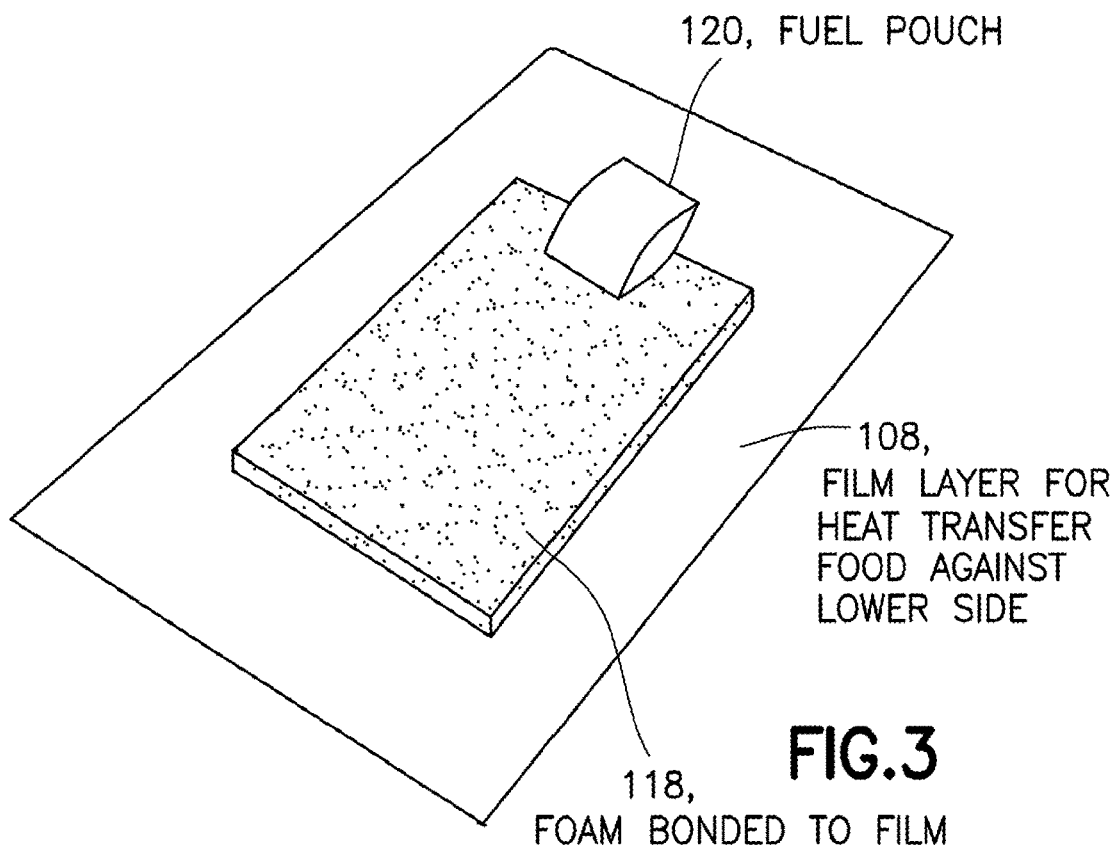
FIG. 3 is a perspective view showing certain components of an exemplary self-heating pouch during manufacturing.

FIG. 3 is a perspective view showing certain components of an exemplary self-heating pouch during manufacturing. More particularly, the image shows a first thin flexible material 108 (marked with "film layer for heat-transfer" and "food against lower side" in the figure), a frangible container 120 (marked with "fuel pouch" in the figure), and a thin porous substrate 118 (marked with "foam bonded to film" in the figure).

Figure 4:
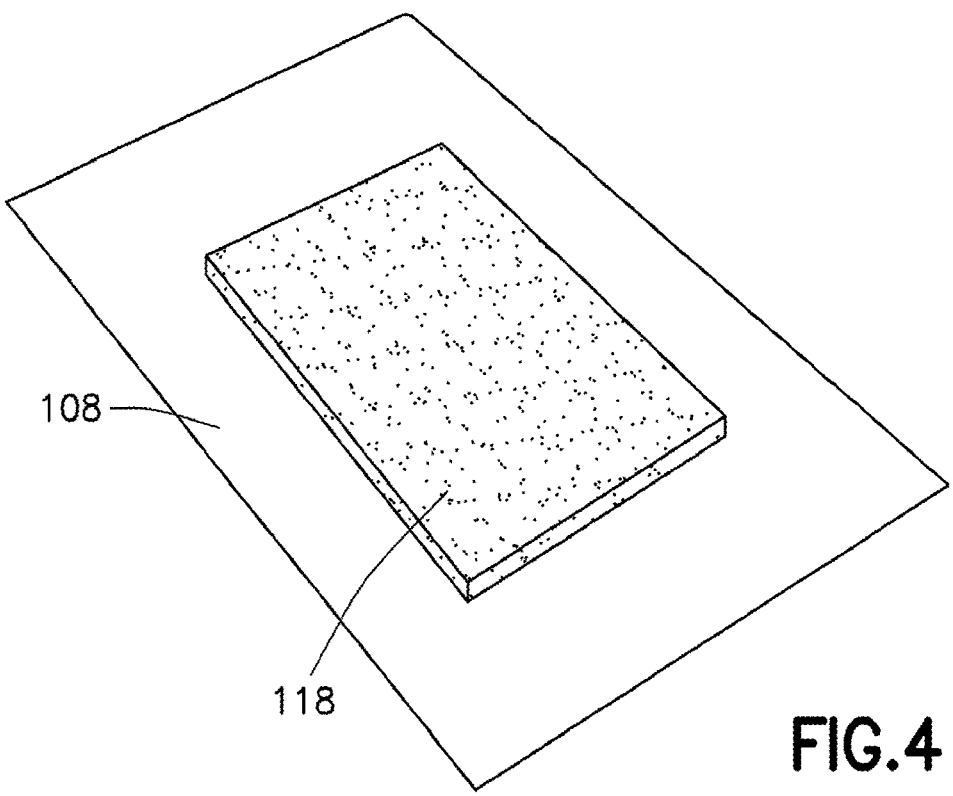
FIG. 4 shows certain components of an exemplary self-heating food pouch during manufacturing.

FIG. 4 shows certain components of an exemplary self-heating food pouch during manufacturing. More particularly, the image shows a piece of material, with which to form the thin flexible material 108 with a thin porous substrate 118 (e.g., foam) atop and bonded to it.

Figure 5:
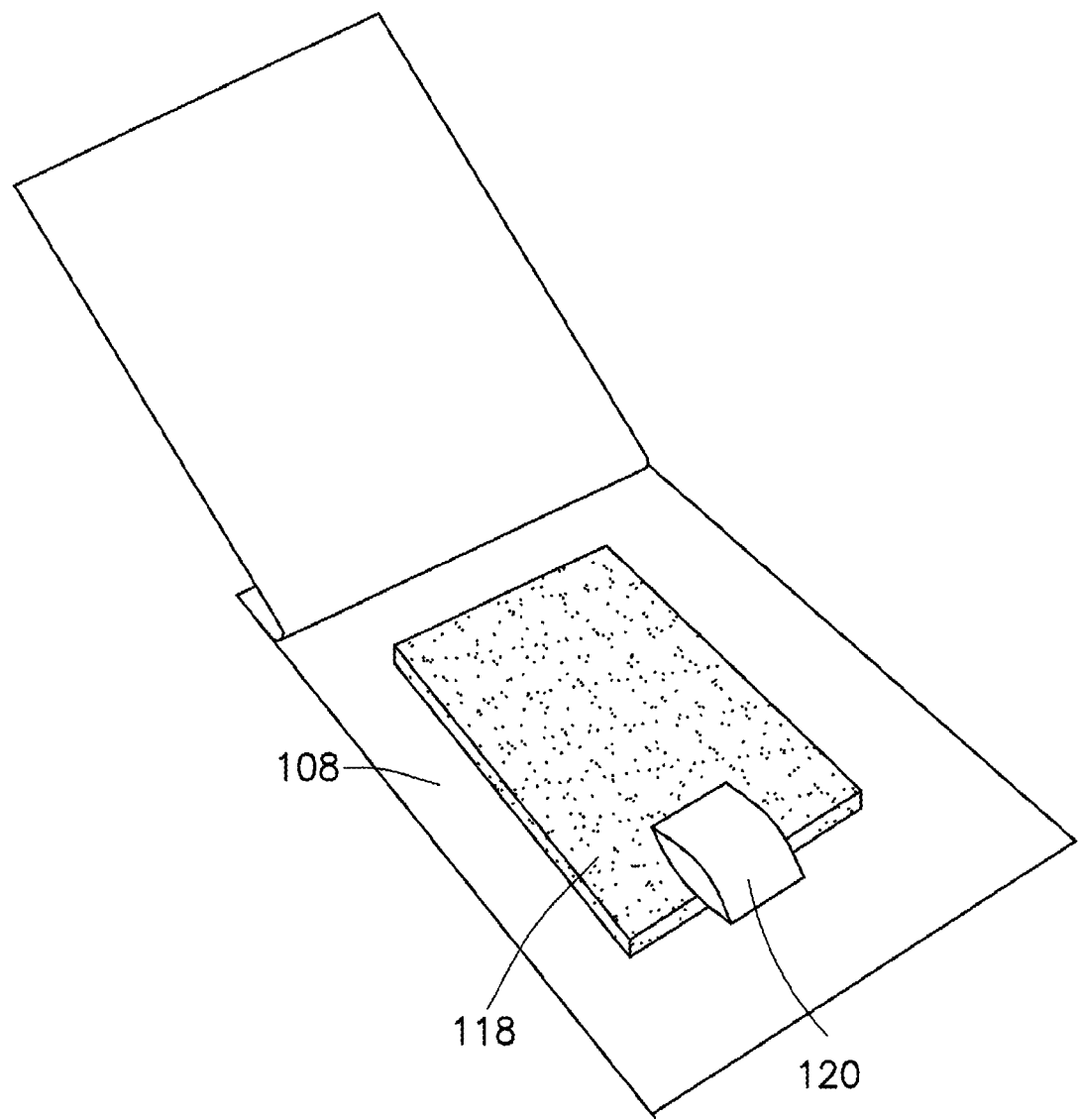
FIG. 5 shows certain components of an exemplary self-heating food pouch during manufacturing.

FIG. 5 shows certain components of an exemplary self-heating food pouch during manufacturing. More particularly, the image shows the partial exemplary self-heating food pouch of FIG. 4, but with a frangible container 120 also located proximate, and in contact with (and partially overlapping above), the thin porous substrate 118 (e.g., foam).

Figure 6:
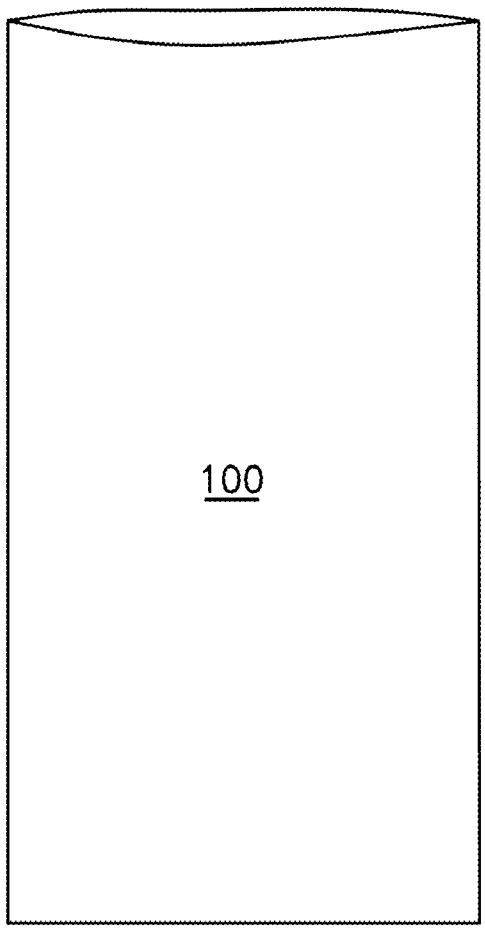
FIG. 6 shows an exemplary completed, but not sealed off, heater.

FIG. 6 shows an exemplary completed, but not sealed off, heater 100.

A number of embodiments of the invention have been described. Nevertheless, it will be understood that various modifications may be made without departing from the spirit and scope of the invention.

For example, in some implementations, the self-heating product pouch may be sold without any product inside the product compartment. The product compartment, in those implementations, may be open (or able to be opened with relative ease, e.g., by hand), and able to receive a separate container (e.g., a bag or package, etc.) of product to be heated, or simply loose product to be heated.

It should be understood that relative terminology used herein, such as "upper", "lower", "above", "below", "front", "rear," etc. is solely for the purposes of clarity and is not intended to limit the scope of what is described here to require particular positions and/or orientations. Accordingly, such relative terminology should not be construed to limit the scope of the present application.

Additionally, the term substantially, and similar words, such as substantial, are used herein. Unless otherwise indicated, substantially, and similar words, should be construed broadly to mean completely and/or almost completely. For example, the granular second reactant is described as being distributed or dispersed, with substantial uniformity, throughout the thin porous substrate. In some implementations, this may mean that the density of grains in multiple equal volumes of the this porous substrate (e.g., cubic centimeters) does not vary more than 15% or 20%. As another example, the thin porous substrate is described as supporting and substantially maintaining the distribution of the granular reactant throughout the thin porous substrate before and during the exothermic chemical reaction. In some implementations, this may mean preventing shifting of grains (of the granular second reactant) so as to maintain the substantial uniformity of distribution.

Moreover, while this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting or being implemented in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and performing certain operations in parallel may be advantageous, and in certain implementations certain sequences of steps may be reversed.

Other implementations are within the scope of the present disclosure.

What is claimed is:

1. A self-heating product pouch comprising:
   a first thin flexible material that surrounds and defines a product compartment; and
   a second thin flexible material coupled to an outwardly-facing surface of the first thin flexible material to define a first heater compartment that is outside, but thermally coupled to, the product compartment;
   a first flat piece of thin porous substrate inside the first heater compartment;
   a granular reactant distributed throughout the first flat piece of thin porous substrate;
   a frangible container inside the first heater compartment; and
   a liquid reactant inside the frangible container,
   wherein the granular reactant and the liquid reactant are adapted to react exothermically upon contact with one another.

2. The self-heating product pouch of claim 1, further comprising:
   a food or other product to be heated within the product compartment.

3. The self-heating product pouch of claim 1 configured such that heat from the exothermic reaction can pass through a heat transfer surface defined by the first thin flexible material into the product compartment.

4. The self-heating product pouch of claim 1, further comprising:
   an adhesive securing the first flat piece of thin porous substrate to the outwardly-facing surface of the first thin flexible material.

5. The self-heating product pouch of claim 1, wherein at least the first heater compartment is vacuum packed.

6. The self-heating product pouch of claim 5, wherein the second thin flexible material is configured, at least by virtue of the vacuum packing, to press the first flat piece of thin porous substrate against the outwardly-facing surface of the first flat piece of thin flexible material thereby holding the first flat piece of thin porous substrate in place.

7. The self-heating product pouch of claim 6, wherein the pressing of the first flat piece of thin porous substrate by the second thin flexible material against the outwardly-facing surface of the first flat piece of thin flexible material discourages movement by the distributed granular reactant relative to the first flat piece of thin porous substrate.

8. The self-heating product pouch of claim 5, wherein the second thin flexible material is configured, at least by virtue of the vacuum packing, to press the frangible container against the outwardly-facing surface to thereby hold the frangible container in place.

9. The self-heating product pouch of claim 1, wherein the frangible container is configured such that, a person squeezing an external surface of the self-heating food pouch can rupture the frangible container.

10. The self-heating product pouch of claim 9, wherein the first flat piece of thin porous substrate is configured to wick the liquid reactant and thereby facilitate contact with the granular reactant distributed throughout the first flat piece of thin porous substrate after the frangible container has been ruptured.

11. The self-heating product pouch of claim 10, wherein the first heater compartment is configured to remain sealed during the exothermic reaction.

12. The self-heating product pouch of claim 1, wherein the granular reactant is distributed throughout the first flat piece of thin porous substrate with substantial consistency across an entirety of the first flat piece of thin porous substrate.

13. The self-heating product pouch of claim 1, wherein the first flat piece of thin porous substrate has a thickness no greater than ¼ inch.

14. The self-heating product pouch of claim 1, further comprising:
a third thin flexible material coupled to a second outwardly-facing surface of the first thin flexible material to define a second heater compartment that is outside, but thermally coupled to, the product compartment;
a second flat piece of thin porous substrate inside the second heater compartment;
more of the granular reactant distributed throughout the second flat piece of thin porous substrate inside the second heater compartment;
a frangible container inside the second heater compartment; and
more of the liquid reactant inside the frangible container inside the second heater compartment.

15. The self-heating product pouch of claim 14, wherein the product compartment is disposed between the first heater compartment and the second heater compartment.

16. The self-heating product pouch of claim 14, wherein a distance across the product compartment from the first heater compartment to the second heater compartment is no more than one inch.

17. The self-heating product pouch of claim 1, wherein the first thin flexible material comprises:
a first piece of the first thin flexible material; and
a second piece of the first thin flexible material,
wherein the first piece of the first thin flexible material is connected to the second piece of the first thin flexible material around a perimeter, and
wherein the product compartment is between the first piece of the first piece of thin flexible material and the second piece of the first thin flexible material and within the perimeter.

18. The self-heating product pouch of claim 1, wherein the second thin flexible material is coupled to the outwardly-facing surface of a first piece of the first thin flexible material at a perimeter, and
wherein the first heater compartment is between the second thin flexible material and within the perimeter.

19. The self-heating product pouch of claim 1, wherein the first heater compartment is thermally coupled to the product compartment by virtue of being physically adjacent to the product compartment and separated from the product compartment by only a first piece of the first thin flexible material.

20. The self-heating product pouch of claim 1, wherein the first flat piece of thin porous substrate is in physical contact with the outwardly-facing surface of the first flat piece of thin flexible material.

21. The self-heating product pouch of claim 1, wherein the granular reactant is distributed throughout the first flat piece of thin porous substrate with substantial uniformity.

22. The self-heating product pouch of claim 1, wherein the product compartment is able to receive a separate container of product, or loose product, to be heated.

23. A method for producing a self-heating product pouch, the method comprising:
distributing a granular reactant throughout a first flat piece of thin porous substrate;
placing the first flat piece of thin porous substrate in physical contact with a surface of a first thin flexible material;
providing a frangible container that contains a liquid reactant;
positioning the frangible container near or in contact with the thin porous substrate; and
coupling a second thin flexible material to the surface of the first thin flexible material to define a first heater compartment that contains the first flat piece of thin porous substrate with the distributed granular reactant, and the frangible container,
wherein the granular reactant and the liquid reactant are adapted to exothermically react upon contact with one another.

24. The method of claim 23, further comprising forming a product compartment with the first thin flexible material.

25. The method of claim 24, further comprising placing a food or other product to be heated within the product compartment.

26. The method of claim 23, further comprising:
securing the first flat piece of thin porous substrate to the surface of the first thin flexible material with an adhesive.

27. The method of claim 23, further comprising:
vacuum packing the first heater compartment, so that the second thin flexible material presses the first flat piece of thin porous substrate against the surface of the first thin flexible material thereby holding the first flat piece of thin porous substrate in place, and substantially holding the distributed granular reactant in place throughout the first flat piece of thin porous substrate.

28. The method of claim 23, further comprising:
coupling a third thin flexible material to another surface of the thin flexible material to define a second heater compartment;
positioning a second flat piece of thin porous substrate inside the second heater compartment and in physical contact with the surface of the thin flexible material;
distributing more of the granular reactant throughout the second flat piece of thin porous substrate of the second heater compartment; and
positioning a frangible container, with more of the liquid reactant, inside the second heater compartment.

29. The method of claim 28, further comprising:
disposing the product compartment between the first heater compartment and the second heater compartment.

30. The self-heating product pouch of claim 1,
wherein the first flat piece of flat piece of thin porous substrate comprises an outwardly-facing side and an inwardly-facing side opposite the outwardly-facing side, wherein the outwardly-facing side of the first flat piece of thin porous material is in direct physical contact with an inner surface of the second thin flexible material, and wherein the inwardly-facing side of the first flat piece of thin porous material is in direct physical contact with the outwardly-facing surface of the first thin flexible material.

31. The self-heating pouch of claim 30, wherein the first flat piece of thin porous material has a uniform open cell foam structure between the outwardly-facing side of the thin porous material and the inwardly-facing side of the thin porous material.

32. The self-heating product pouch of claim 1, wherein the first flat piece of thin porous substrate is the only piece of thin porous substrate in the first heater compartment.

33. The self-heating product pouch of claim 32, wherein the first flat piece of thin porous material is not pouch-shaped.

34. The self-heating product pouch of claim 32, wherein a density of grains for the granular reactant distributed throughout the first flat piece of thin porous substrate does not vary more than 20% across multiple equal volumes of the first flat piece of thin porous substrate.

35. The method of claim 23,
wherein the first flat piece of thin porous substrate comprises an outwardly-facing side and an inwardly-facing side opposite the outwardly-facing side, wherein the outwardly-facing side of the first flat piece of thin porous substrate is in direct physical contact with an inner surface of the second thin flexible material, and wherein the inwardly-facing side of the first flat piece of thin porous substrate is in direct physical contact with the outwardly-facing surface of the first thin flexible material.

36. The method of claim 35, wherein the first flat piece of thin porous substrate has a uniform open cell foam structure between the outwardly-facing side of the first piece of thin porous substrate and the inwardly-facing side of the first piece of thin porous substrate.

37. The method of claim 23, wherein the first flat piece of thin porous substrate is the only piece of thin porous substrate in the first heater compartment.

38. The method of claim 37, wherein the first flat piece of thin porous substrate is not pouch-shaped.

39. The method of claim 37, wherein a density of grains for the granular reactant distributed throughout the first flat piece of thin porous substrate does not vary more than 20% across multiple equal volumes of the first flat piece of thin porous substrate.

* * * * *